US011323970B2

United States Patent
Hojeij et al.

(10) Patent No.: US 11,323,970 B2
(45) Date of Patent: May 3, 2022

(54) METHOD AND APPARATUS FOR USER DISTRIBUTION TO SUB-BANDS IN MULTIPLE ACCESS COMMUNICATIONS SYSTEMS

(71) Applicants: INSTITUT MINES-TELECOM, Palaiseau (FR); UNIVERSITE LIBANAISE, Beirut (LB); UNIVERSITE SAINT-ESPRIT DE KASLIK, Jounieh (LB)

(72) Inventors: Marie-Rita Hojeij, Mont Liban (LB); Charbel Abdel Nour, Brest (FR); Joumana Farah, Mont Liban (LB); Catherine Douillard, Brest (FR)

(73) Assignees: INSTITUT MINES-TELECOM, Palaiseau (FR); UNIVERSITE LIBANAISE, Beirut (LB); UNIVERSITE SAINT-ESPRIT DE KASLIK, Jounieh (LB)

(*) Notice: Subject to any disclaimer, the term of this patent is extended or adjusted under 35 U.S.C. 154(b) by 0 days.

(21) Appl. No.: 17/042,464

(22) PCT Filed: Mar. 20, 2019

(86) PCT No.: PCT/EP2019/057008
§ 371 (c)(1),
(2) Date: Sep. 28, 2020

(87) PCT Pub. No.: WO2019/185429
PCT Pub. Date: Oct. 3, 2019

(65) Prior Publication Data
US 2021/0022089 A1  Jan. 21, 2021

(30) Foreign Application Priority Data
Mar. 28, 2018 (EP) .................................... 18305354

(51) Int. Cl.
H04W 52/34 (2009.01)
H04L 5/00 (2006.01)
H04W 72/04 (2009.01)

(52) U.S. Cl.
CPC ......... *H04W 52/346* (2013.01); *H04L 5/0071* (2013.01); *H04L 5/0075* (2013.01); *H04W 72/0446* (2013.01); *H04W 72/0453* (2013.01)

(58) Field of Classification Search
CPC ........... H04W 52/346; H04W 72/0446; H04W 72/0453; H04L 5/0071; H04L 5/0075; H04L 5/003; H04J 15/00; H04J 11/004
See application file for complete search history.

(56) References Cited

U.S. PATENT DOCUMENTS

2017/0117996 A1* 4/2017 Lorca Hernando ... H04L 5/0073

FOREIGN PATENT DOCUMENTS

EP  3 273 736 A1  1/2018

OTHER PUBLICATIONS

Gueguen, et al., "Compensated Proportional Fair Scheduling in Multiuser OFDM Wireless Networks", Proc. IEEE International conference on Wireless Mobile Computing, Networking Communication, (2008).

(Continued)

*Primary Examiner* — Ricardo H Castaneyra
(74) *Attorney, Agent, or Firm* — BakerHostetler (57) ABSTRACT

A system and method for assigning users to a particular sub band in a given time slot in a NOMA system, where whichever pair of users corresponds to the smallest "candidate pair user throughput deviation value", reflecting the aggregate of the respective difference between the average throughput across all users (K) and the known throughput of each of the two users under consideration ($k_1 k_2$), and each user attributed to a sub-band other than the selected sub- (Continued)

band. User pairs for consideration may consider all possible pairs, or may be limited to candidate pairs satisfying together, or comprising one or both users who satisfy a criterion such as channel gain, distance to a target, throughput or a combination of some or all of these factors. The power allocated to each sub-band may be attributed by a waterfilling algorithm.

13 Claims, 3 Drawing Sheets

(56) References Cited

OTHER PUBLICATIONS

Mehrjoo, et al., "Design of Fair Weights for Heterogeneous Traffic Scheduling in Multichannel Wireless Networks", IEEE Trans. Commun., vol. 58, No. 10, pp. 2892-2902, Oct. 10, 2010.

Saito, et al., "System-Level Performance of Downlink Non-orthogonal Multiple Access (NOMA) Under Various Environments", 2015 IEEE 81st Vehicular Technology Conference (VTC Spring), 2015.

Hojeij, et al., "New Optimal and Suboptimal Resource Allocation Techniques for Downlink Non-orthogonal Multiple Access", Wireless Personal Communications, vol. 87, No. 3, pp. 837-867, May 10, 2015.

Kim, et al., "Iterative and greedy resource allocation in an uplink OFDMA system", 2004 IEEE 15th International Symposium on Personal, Indoor and Mobile Radio Communications, vol. 4, pp. 2377-2381, Sep. 5, 2004.

Tse, et al., "Fundamentals of Wireless Communication", Cambridge University Press, pp. 267-285, 2005.

Endo, et al., "Uplink Non-orthogonal Access with MMSE-SIC in the Presence of Inter-cell Interference", Proc. 2012 IEEE Int. Symp. on. Wireless Commun. Syst, 2012.

Saito, et al., "System-level performance evaluation of downlink non-orthogonal multiple access (NOMA)", 2013 IEEE 24th Annual International Symposium on Personal, Indoor, and Mobile Radio Communications (PIMRC), 2013.

Umehara, et al., "Enhancing user fairness in non-orthogonal access with successive interference cancellation for cellular downlink", Proc. International Conference on Communication Systems (ICCS 2012).

Yang, et al., "A Weighted Proportional Fair Scheduling to Maximize Best-Effort Service Utility in Multicell Network", Proc. IEEE International Symposium on Personal, Indoor and Mobile Radio Communications, (2008).

\* cited by examiner

METHOD AND APPARATUS FOR USER DISTRIBUTION TO SUB-BANDS IN MULTIPLE ACCESS COMMUNICATIONS SYSTEMS

CROSS-REFERENCE TO RELATED APPLICATIONS

This application is a National Stage of International patent application PCT/EP2019/057008, filed on Mar. 20, 2019, which claims priority to foreign European patent application No. EP 18305354.5, filed on Mar. 28, 2018, the disclosures of which are incorporated by reference in their entirety.

FIELD OF THE INVENTION

The present invention relates to the user distribution to sub-bands in multiple access communications system such as Non-Orthogonal Multiple Access (NOMA).

BACKGROUND OF THE INVENTION

With the proliferation of internet applications, it is expected that the mobile traffic volume supported by communication networks increases by 8 times between the end of 2016 and 2022. To respond favourably to such constraints while keeping a high level of user quality of experience, system capacity and user fairness should be largely improved for the future 5th generation (5G) mobile communication systems. To this end, Non-Orthogonal Multiple Access (NOMA) has recently emerged as a promising candidate for future radio access. By exploiting an additional multiplexing domain, the power domain, NOMA allows the cohabitation of multiple users per sub-band at the transmitter side, on top of the modulation layer which may be Orthogonal Frequency Division Multiplex (OFDM), Filter Bank Multi-Carrier (FBMC), Universal Filtered Multi-Carrier (UFMC), or other multiple carrier scheme, and relies on an interference cancellation technique at the receiver side, such as Successive Interference Cancellation (SIC). An attractive feature of NOMA is that it targets the increase of system capacity while improving user fairness. Therefore, most of the prior art dealing with NOMA considers the proportional fairness (PF) scheduler as a multiuser scheduling scheme for the trade-off between total user throughput or data rate and the user fairness that it provides. Examples of power allocation algorithms, jointly implemented with a NOMA-based PF scheduler used for the selection of users to be assigned to each sub-band are presented for example in "Uplink non-orthogonal access with MMSE-SIC in the presence of inter-cell interference" by Y. Endo, Y. Kishiyama, and K. Higuchi. in proc. 2012 IEEE Int. Symp. on. Wireless Commun. Syst, 2012, or "System-Level Performance of Downlink Non-orthogonal Multiple Access (NOMA) Under Various Environments" by Y. Saito, A. Benjebbour, Y. Kishiyama, and T. Nakamura in proc. IEEE 81st VTC, 2015.

In the article drafted by by Umehara, J., Kishiyama, Y., Higuchi, K. entitled "Enhancing user fairness in non-orthogonal access with successive interference cancellation for cellular downlink", in Proc. International Conference on Communication Systems (ICCS 2012), the authors propose a weighted PF-based multiuser scheduling scheme in a non-orthogonal access downlink system. A frequency block access policy is proposed for cell-interior and cell-edge user groups in fractional frequency reuse (FFR), with significant improvements in the user fairness and system frequency efficiency.

In the article by Mehrjoo, M., Awad, M. K., Dianati, M., Xuemin, S., entitled "Design of Fair Weights for Heterogeneous Traffic Scheduling in Multichannel Wireless Networks," IEEE Trans. Commun., 58(10) (2010), fair weights have been implemented for opportunistic scheduling of heterogeneous traffic types for OFDMA networks. For designing fair weights, the proposed scheduler takes into account average channel status and resource requirements in terms of traffic types. Simulation analysis demonstrates the efficiency of the proposed scheme in terms of resource utilization, and flexibility to network characteristics change due to user mobility.

In the article from Gueguen, C., Baey, S., entitled "Compensated Proportional Fair Scheduling in Multiuser OFDM Wireless Networks", in Proc. IEEE International conference on Wireless Mobile Computing, Networking Communication (2008), the problem of fairness deficiency encountered by the PF scheduler when the mobiles experience unequal path loss is investigated. To mitigate this issue, a modified version of the PF scheduler that introduces distance compensation factors has been proposed. It was shown that this solution achieves both high capacity and high fairness.

In the article by Yang, C., Wang, W., Qian, Y., Zhang X., entitled "A Weighted Proportional Fair Scheduling to Maximize Best-Effort Service Utility in Multicell Network, in Proc. IEEE International Symposium on Personal, Indoor and Mobile Radio Communications (2008), a weighted proportional fair algorithm is proposed in order to maximize best-effort service utility. The reason behind introducing weight factors to the PF metric is to exploit the inherent near-far diversity given by the path loss. The proposed algorithm enhances both best-effort service utility and throughput performance while maintaining similar complexity when compared to the PF metric.

If a downlink system with a single transmitter and receiver antenna is considered, the system consists of K users per cell, with a total system bandwidth B divided into S sub-bands, and a maximum allowable transmit power $P_{max}$ by the Base Station. Among the K users, a set of users $U_s = \{k_1, k_2, \ldots, k_n, \ldots, k_N\}$, is selected to be scheduled over each frequency sub-band s, ($1 \leq s \leq S$). N indicates the number of users non-orthogonally scheduled on a sub-band. The Successive Interference Canceller (SIC) process as described in Fundamentals of Wireless Communication, Cambridge University Press, 2005 by D. Tse, and P. Viswanath, is conducted at the receiver side, and the optimum order for user decoding is in the increasing order of the channel gains observed by users, normalized by the noise and inter-cell interference $$\frac{h_{s,k_n}^2}{n_{s,k_n}}$$

where $h_{s,k_n}$ is the equivalent channel gain at sub-band s, between user $k_n$ and the base station BS, and $n_{s,k_n}$ the average power of the Gaussian noise plus intercell interference received by user $k_n$. Assuming successful decoding and no SIC error propagation, and supposing that inter-cell interference is randomized such that it can be considered as white noise, the throughput of user $k_n$, at sub-band s, $R_{s,k_n}$, is given by:

$$R_{s,k_n} = \frac{B}{S}\log_2\left(1 + \frac{h_{s,k_n}^2 P_{s,k_n}}{\sum_{k_j \in U^s, \frac{h_{s,k_n}^2}{n_{s,k_n}} < \frac{h_{s,k_j}^2}{n_{s,k_{nj}}}} h_{s,k_n}^2 P_{s,k_j} + n_{s,k_n}}\right) \quad \text{Eq. (1)}$$

Where

K is the number of users per cell,

B is the total system bandwidth, $k_n$ is a user n of K,

N is the number of users non-orthogonally scheduled on a sub-band, $U^s = \{k_1, k_2, \ldots, k_n, \ldots, k_N\}$, is the set of users selected to be scheduled over each frequency sub-band, $k_j$ considers the users of $U^s$ having a channel gain greater than $k_n$, S is the number of sub-bands in the system, s is the sub band under consideration ($1 \leq s \leq S$), $P_{max}$ is the maximum allowable transmit power, $$\frac{h_{s,k_n}^2}{n_{s,k_n}}$$

is the squared channel gain observed by user $k_n$, normalized by the noise and inter-cell interference where $h_{s,k_n}$ is the equivalent channel gain at sub-band s, between user $k_n$ and the base station BS, and $n_{s,k_n}$ the average power of the Gaussian noise plus intercell interference received by $k_n$, at sub-band s, and $R_{s,k}(t)$ represents the throughput of user k on sub-band s.

The transmit power allocation constraint is represented by:

$$\sum_{s=1}^{S} P_s = P_{max}, \quad (2)$$

with $P_s = \sum_{n=1}^{N} P_{s,k_n}$

Where $P_s$ denotes the amount of allocated power on sub-band s.

Since the scheduler in NOMA may allocate a sub-band to more than one user simultaneously, the user scheduling policy affects system efficiency and user fairness as different policies may lead to preferential treatment of certain users in the interest of improved overall throughput, even if this means degraded service for other users, or vice versa.

The "Proportional Fairness" (PF) scheduler as introduced by the prior art references above is considered to achieve a trade-off between these two metrics. The objective of the PF scheduler is to maximize the long term averaged user rates, in order to ensure balance between cell throughput and user fairness. The PF algorithm is used in LTE (acronym for Long Term Evolution, a 4$^{th}$ generation wireless broadband technology developed by the 3$^{rd}$ Generation Partnership Project, 3GPP) for user scheduling (assignment of users to time-frequency resource blocks).

The operation of the PF scheduler is as follows: at the beginning of each scheduling slot t, each user provides the base station (BS) with its channel state. The BS can then compute the achievable throughput for each user (depending on the adopted power allocation strategy). The PF scheduler (operating at the BS side) keeps track of the average throughput achieved by each user in a past window of length $t_c$ and gives each user a priority inversely proportional to its average throughput.

At the beginning of each scheduling time slot t, each user k provides the base station with its channel gain on each sub-band s, s=1 . . . S.

The base station computes the corresponding achievable throughput for user k on sub-band s, $R_{s,k}(t)$.

At a time slot t, user k* is selected to be served on sub-band s based on:

$$k^* = \underset{k=1\ldots K}{\arg\max} \frac{R_{s,k}(t)}{T_k(t)} \quad (3)$$

A scheduler applying this approach gives each user a priority inversely proportional to its average throughput $T_k(t)$, computed in a past window of length $t_c$. If $T_k(t)$ is high, user k will possibly not be assigned any transmission rate for several time slots. This is problematic for applications requiring quasi-constant Quality of Experience (QoE), and may call for deep buffering. By the same token, this approach may raise difficulties for applications requiring low latency transmission.

The PF scheduling algorithm was initially devised for orthogonal multiple access schemes (OFDMA in LTE) but was later adapted for Non-Orthogonal Multiple Access (NOMA) schemes.

This scheduling policy has been adopted in the majority of proposed NOMA implementations. The scheduling algorithm keeps track of the average throughput $T_k(t)$ of each user in a past window of length $t_c$, where $t_c$ defines the throughput averaging time window (over a specified number of previous time slots). $T_k(t)$ is defined as:

$$T_k(t+1) = \left(1 - \frac{1}{t_c}\right)T_k(t) + \frac{1}{t_c}\sum_{s=1}^{S} R_{s,k}(t) \quad (4)$$

where $R_{s,k}(t)$ represents the achievable throughput of user k on sub-band s, at time instance t. It is calculated based on Eq.(1) above, and can equal zero if user k is not scheduled on sub-band s.

In the case of NOMA, where N>1, the possible candidate user sets are enumerated $$C = \binom{K}{N}$$

combinations U of N users among K

At the beginning of each scheduling time slot t, each user k provides the base station with its channel gain on each sub-band s, s=1 . . . S. For each candidate user set U ($U \in \{U_1, \ldots, U_C\}$) on sub-band s, the base station computes the corresponding throughput for user k in set U, $R_{s,k|U}(t)$.

At time t, the selected user set is:

$$U_s = \underset{U \in \{U_1 \ldots U_C\}}{\arg\max} \sum_{k \in U} \frac{R_{s,k|U}(t)}{T_k(t)} \quad (5)$$

Where $R_{s,k|U}(t)$ is the achievable throughput of user k on sub-band s at time t, considering user set U, $T_k(t)$ is the average throughput of user k in a past window of length $t_c$, considering all the sub-bands and assuming the available frequency band B is divided into S sub-bands, the total number of users willing to communicate is K, the number of users on sub-band s is N (in OMA N=1, in NOMA N>1), and the total power budget is $P_{max}$. At the beginning of the scheduling process, all the users have throughput equal to 0, and at the beginning of each scheduling time slot t, each user k provides the base station with its channel gain on each sub-band s, with s=1 ... S, $h_{s,k}(t)$, and the average throughput Tk(t) of user k is computed for a past window of length $t_c$, considering all the sub-bands.

The PF scheduler targets long-term fairness. Since the PF scheduler gives each user a priority inversely proportional to its average throughput, it happens that some users do not gain access to available resources whenever their average throughput is high. In such a case, the users will not be assigned any transmission rate for multiple scheduling slots. This behaviour can be very problematic in applications with constraints on user throughput (e. g. quasi-constant data rate applications), or where deep buffering may be needed, and may not be compatible with applications requiring low latency transmission. Moreover, for NOMA schemes, the PF scheduler does not take account of a NOMA specificity: the overall throughput achieved in NOMA systems increases with the difference in channel gains of paired users.

In general, when using PF scheduling for user allocation in NOMA schemes, a large user throughput gain can be observed for users located near the base station compared to orthogonal multiple access (OMA) schemes, but almost no gain is achieved for cell edge users.

It is thus desirable to identify a mechanism for resolving these issues and in particular providing a method for a better attribution of users.

SUMMARY OF THE INVENTION

According to the present invention in a first aspect there is provided a system for assigning users from a set of candidate users to one of a plurality of sub-bands (s) in a current time slot (t) in a multiple access communications system, comprising an assignment processor adapted to select a plurality of candidate pairs of the users each candidate pair comprising a respective first user ($k_1$) and a respective candidate second user ($k_2$), for consideration with respect to the selected sub-band. The system further comprises a power calculator adapted to perform a provisional power allocation to each sub-band with regard to each candidate pair, and a throughput calculator adapted to determine a respective candidate pair user throughput deviation value reflecting the aggregate of the respective difference between the average throughput across the set of candidate users and the known throughput of each of the first user ($k_1$), the candidate second user ($k_2$), and each user attributed to a sub-band other than the selected sub-band. The assignment calculator is further adapted to assign to the sub-band whichever candidate pair of users corresponds to the smallest respective candidate pair user throughput deviation value.

According to the present invention, in a second aspect, there is provided a method of selection of a first user ($k_1$) and a second user ($k_2$) among a set of candidate users for attribution to one of a plurality of sub-bands (s) in a current time slot (t) in a multiple access communications system. This method comprises the steps of selecting a candidate pair of users comprising a respective first user ($k_1$) and a respective candidate second user ($k_2$), for consideration with respect to the selected sub-band, and performing a provisional power allocation to each sub-band. The method further comprises the step of determining a candidate pair user throughput deviation value reflecting the aggregate of the respective difference between the average throughput across the set of candidate users and the known throughput of each of the first user ($k_1$), the candidate second user ($k_2$), and each user attributed to a sub-band other than the selected sub-band. The steps of selecting a candidate pair of users, performing a provisional power allocation, determining a candidate pair user throughput deviation value for a plurality of further candidate pair of users, are repeated, and whichever candidate pair of users corresponds to the smallest respective candidate pair user throughput deviation value is assigned to the sub-band.

In a development of the second aspect, the power allocated to each sub-band is attributed by a waterfilling algorithm such that the power allocated to each sub-band has regard to the channel gain of each user in the candidate pair, and the channel gain of any user already assigned to any sub-band in the current time slot. In 3G and 4G systems, a parameter is generally fed back from the receiver to the transmitter with information regarding the quality of the channel. This can be treated in accordance with some embodiments of the present invention as an indicator of the channel gain value, and it is presumed that implementations of NOMA in accordance with the present invention will provide some analogous mechanism. As such, in any embodiment, whilst waterfilling is performed based on the channel gain of the users, this need not depend on an explicit measurement of each user's channel gain, but may also use any value that may be obtained or derived in the system which may be taken as indicative of a respective user's channel gain.

In a development of the second aspect, the known throughput for each user takes account of the projected throughput for that respective user for the current time slot in addition to the average throughput during an historical time window for that respective user.

In a development of the second aspect, the step of determining a candidate pair user throughput deviation value comprises the step of calculating a known throughput of each user in the candidate pair, and any user already assigned to any sub-band in the current time slot, and calculating an average total throughput as an average of the respective known throughput calculated for each user in the set of candidate users. A user throughput deviation value is calculated for each user in the candidate pair, and any user already assigned to any sub-band in the current time slot. The user throughput deviation value corresponds to the difference between the respective known throughput for that user and the average total throughput value. The respective user throughput deviation values for each user in the candidate pair, and any user already assigned to any sub-band in the current time slot are combined to obtain the candidate pair user throughput deviation value.

In a development of the second aspect, the steps of selecting a candidate pair of users, performing a provisional power allocation, and determining a candidate pair user throughput deviation value, are repeated until every possible candidate pair of users has been considered.

In a development of the second aspect, the steps of selecting a candidate pair of users, performing a provisional power allocation, and determining a candidate pair user throughput deviation value, are repeated until every possible candidate pair of users comprising a first candidate user satisfying a specified criterion has been considered.

In a development of the second aspect, the specified criterion is based on one or more of channel gain, distance to a target or throughput.

In a development of the second aspect, the steps of selecting a candidate pair of users, performing a provisional power allocation, determining a candidate pair user throughput deviation value for a plurality of further candidate pair of users, and assigning to the sub-band whichever candidate pair of users corresponds to the smallest respective candidate pair user throughput deviation value are repeated for each sub-band, until one or more users are attributed to each sub-band.

In a development of the second aspect, the step of selecting a candidate pair of users, performing a provisional power allocation, determining a candidate pair user throughput deviation value for a plurality of further candidate pair of users, and assigning to the sub-band whichever candidate pair of users corresponds to the smallest respective candidate pair user throughput deviation value for each sub-band, until one or more users are attributed to each sub-band are repeated for successive time slots.

In accordance with the invention in a third aspect, there is provided an apparatus adapted to implement the steps of the second aspect.

In accordance with the invention in a fourth aspect, there is provided a computer program adapted to implement the steps of the second aspect.

In accordance with the invention in a fifth aspect, there is provided a computer readable medium incorporating the computer program of the fourth aspect.

BRIEF DESCRIPTION OF THE DRAWINGS

The above and other advantages of the present invention will now be described with reference to the accompanying drawings, for illustration purposes only, in which.

DETAILED DESCRIPTION

Generally, there are provided a system and method for assigning users to a particular sub-band in a given time slot in a in multiple access communications system such as Non-Orthogonal Multiple Access (NOMA), where whichever pair of users corresponds to the smallest "candidate pair user throughput deviation value", reflecting the aggregate of the respective difference between the average throughput across all users (K) and the known throughput of each of the two users under consideration ($k_1 k_2$), and each user attributed to a sub-band other than said selected sub-band. User pairs for consideration may consider all possible pairs, or may be limited to candidate pairs satisfying together, or comprising one or both users who satisfy a criterion such as channel gain, distance to a target, throughput or a combination of some or all of these factors. A number of possible implementations of this general approach are set out below by way of illustrations and non-limiting example. While the following examples focus on implementations in the context of NOMA, it will be appreciated that other multiple access communications systems may be envisaged using the same approach.

Figure 1:
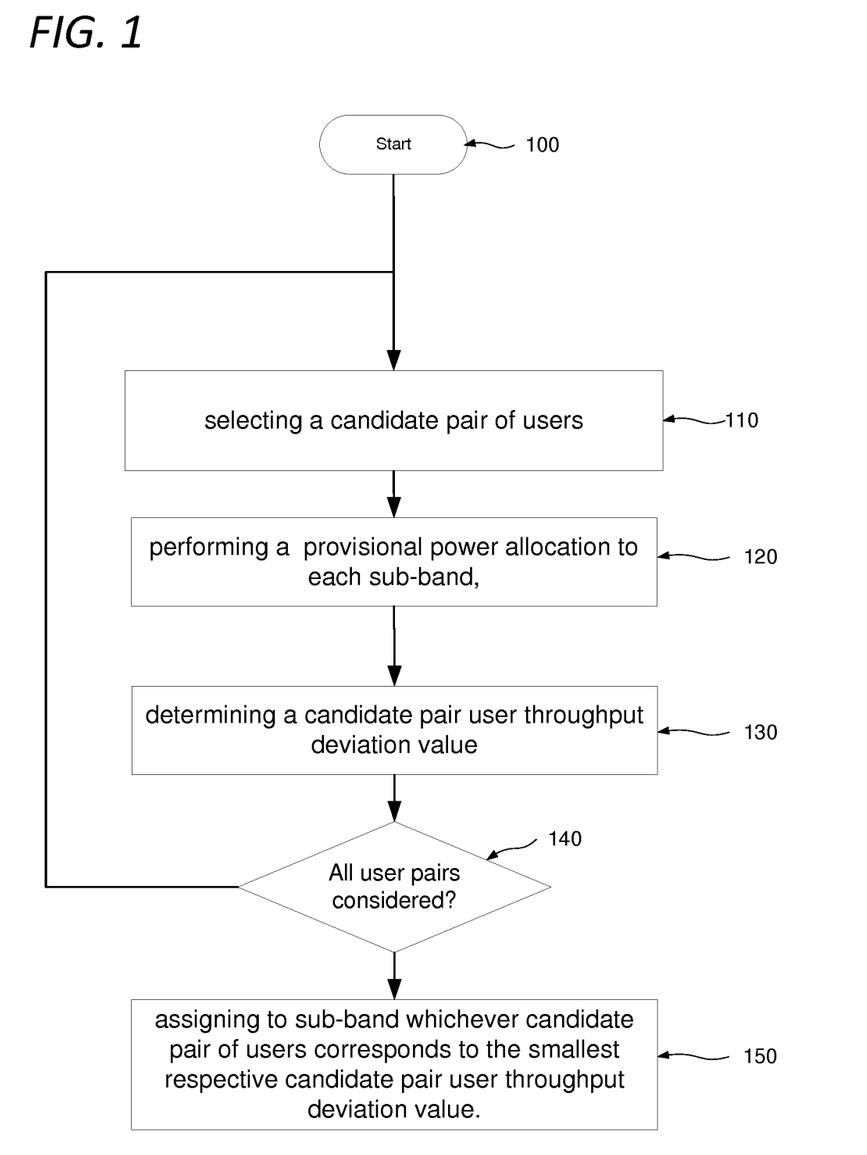
FIG. 1 shows a method attributing users to one or more of a plurality of sub-bands in a multiple access communications system in accordance with an embodiment.

FIG. 1 shows a method of attributing users to one or more of a plurality of sub-bands in a multiple access communications system in accordance with an embodiment. More specifically, there is provided a method of selecting users from a pool of candidate users U for allocation to a plurality of sub-bands in a time slot tin a multiple access communications system.

As shown in FIG. 1, the method starts at step 100, before proceeding to step 110 at which a new time slot begins. Access is granted following allocation of resources in time and frequency. Allocation is divided into a number of time slots. The time slot is the elementary time allocation unit in the communication system. For instance, in LTE systems, it is equal to 1 ms. For each time slot, sub-bands are allocated sequentially until the total number of sub-bands per time slot is reached.

Sub-bands may be considered in any convenient sequence. For example, they may be considered in a random order, in order of the sub-band which has the highest channel gain for a selected user, or otherwise.

The method starts at step 100 before proceeding to step 110 at which a candidate pair of users is selected comprising a first user ($k_1$) and a candidate second user ($k_2$), for consideration with respect to the selected sub-band.

The users to be considered at this step may be selected according to a variety of bases. In certain embodiments, the method may comprise a further step of sorting all users in order of priority according to a criterion prior to the step of assigning. On this basis, at step 110, the users selected may be the users having the highest priority, excluding any user who has already been assigned to an initial sub-band to a selected sub-band in a time slot t.

As such, a priority list may be used at the beginning of the allocation process for the selection of the $1^{st}$ user on each sub-band. This priority list is built to have all users granted a sub-band (and some throughput) at least once at the beginning of the allocation process. At the $1^{st}$ time slot, the priority list may be created: all the K users are sorted in the Base Station (BS). The users are removed from this priority list as soon as they are selected in step 150 as described below). At subsequent time slots, if the list is not empty, only the remaining users are sorted again (update of the priority list). The resulting priority list is used while at least one user has not been assigned any sub-band during the assignment process.

In certain further embodiments, this sorting of users in order of priority may comprise sorting the users in order of best channel gain measured for the current time slot for each user across all sub-bands, where the user accorded the highest priority is the user having the lowest best channel gain.

The lowest best channel gain ("lowest best h") sorting advantageously provides good performance (in terms of cell-edge user throughput and total cell throughput)—Users may be sorted at the base station based on the channel gain experience by users on available sub-bands, $h_{s,k}$ being the channel gain of user k on sub-band s. This may be expressed in the following manner: for each user k, select that user's highest channel gain $h_{s_{best}}$ among the channel gains experienced over all sub-bands. The user with the highest priority is the one having the lowest best channel gain, and vice versa.

In certain embodiments, the user may be selected at random. This may comprise the further step of sorting all users in order of priority according to a random sorting, which may be performed at a lower processing overhead that other sorting approaches.

The method next proceeds to step 120 at which a provisional power allocation is performed to each sub-band.

Power may be distributed equally amongst sub-bands, although there are many alternative approaches of allocation of power to sub-bands (such as waterfilling), and amongst users (for example FPA—Fixed power allocation, FTPA—fractional transmit power allocation or Full Search Power Allocation) within a sub-band, all of which are compatible with and encompassed in the present disclosure.

The achievable throughputs for users $k_1$ and $k_2$ are functions of the power allocated to each user as defined in equation (1) above.

Similarly, the total available transmission power may be distributed between sub-bands by a variety of mechanisms. One example is based on an equal distribution of power. Alternatively, according to certain alternative embodiments, provisional power allocation may be carried out during the pairing process. This provides an opportunity to attempt to identify an optimal power distribution between the users.

In certain embodiments, a provisional iterative waterfilling method may be applied to obtain the provisional distribution to be computed using the same iterative waterfilling method, with the total power amount Pmax to be distributed among all the S sub-bands.

Conventional waterfilling requires an overall optimization over all the users and all the sub-bands and is therefore not compatible with the sequential approach of the present disclosure.

Using a specific formulation, waterfilling can be applied in a sequential fashion: users are selected sequentially, but final power allocation is only performed at the end of the process, once all the users have been chosen. The throughputs can only be computed at the end of the user selections process.

A variant of this waterfilling process can be applied with the assumption that the power assigned to the s first sub-bands (1≤s≤S) is equal to s×Pmax/S where the $s^{th}$ sub-band is the sub-band selected for consideration, S is the total number of available sub-bands, and Pmax is the total power amount to be distributed among all the S sub-bands.

On this basis, Pmax/S is assigned to a first sub-band and no further inter-sub-band calculation is required for this sub-band. In successive iterations, the inter-sub-band power allocation for the $s^{th}$ sub-band assigned in the time slot (s>1) s×Pmax/S is provisionally assigned across the s first sub-bands. In these later iterations, where there are more than one sub-bands to consider, this power is redistributed among all the s sub-bands using the iterative waterfilling procedure as described in more detail below.

Initially, a sub-band attenuation value for candidate set of users is obtained, proportional to the reciprocal of the square of gain of the selected channel, corresponding for each combination to the highest of the channel gain value associated with the users in that candidate set.

Optionally, the sub-band attenuation value may be equal to the total transmission bandwidth multiplied by the Noise power, divided by the square of the selected channel gain value multiplied by the total number of the sub-bands, or $$\frac{BN_0}{sh_{s,k^*}^2},$$

where $N_0$ is the noise power (equal for all sub-bands) and $h_{s,k^*}$ is the channel gain of the user k* showing the highest channel gain in a given combination of users on the sub-band currently under consideration, s designates a particular sub-band under consideration, and S is the total number of sub-bands.

The provisional power assignment may then be calculated for the sub-band under consideration. This is calculated using a waterfilling algorithm across the selected sub-band and every sub-band selected previously, using a floor for each sub-band defined by the respective sub-band attenuation value.

A waterfilling algorithm may be seen as implicitly ensuring that the total power assigned across the carrier under consideration and all other sub-bands to which users have been assigned, is equal to a pro-rata proportion of the total power budget, assuming an equal share of power for each sub-band for the total power budget equal to s×Pmax/S as discussed above, and such that, for each sub-band considered thus far, the sum of the power provisionally assigned to that sub-band and the sub-band attenuation value of that sub-band is a constant.

Specifically, the waterline level is predicted based on the previous level (as determined for the sub-bands allocated so far) and the channel gain of the considered users scheduled on the current sub-band s.

Maximizing the achieved throughput through an optimal sharing a pro-rata proportion of the total transmit power s×Pmax/S among s sub-bands may then be achieved if:

$$P_j + \frac{N_0 B/S}{h_{j,k_j^*}^2} = W_s, \; j = 1 \ldots s \quad (6)$$

where $P_j$ denotes the amount of power allocated to sub-band j, $W_s$ is the waterline at allocation stage s, and $h_{j,k_j^*}^2$ the channel gain of user $k_j^*$ showing the highest channel gain among scheduled users on sub-band j.

During the allocation process, a pro-rata proportion of the total transmit power s×Pmax/S is distributed, at each allocation stage s, among allocated sub-bands based on (5), resulting in:

$$\frac{sP_{max}}{S} = \sum_{j=1}^{s}\left(W_s - \frac{N_0 B/S}{h_{j,k_j^*}^2}\right) \quad (7)$$

which can be re-written as:

$$\frac{sP_{max}}{S} = sW_s - \sum_{j=1}^{s}\left(\frac{N_0 B/S}{h_{j,k_j^*}^2}\right) \quad (8)$$

When allocating power to the next sub-band, denoted by s+1, since a proportional amount of total power is re-distributed by the scheduler, the waterline is updated only if $$\frac{N_0 B/S}{h_{s+1,k_{s+1}^*}^2} < W_{s+1},$$

otherwise it will keep its old value and $w_{s+1}=W_s$. When the waterline is updated, a pro rata proportion of the total transmit power (s+1)Pmax/S is distributed at stage s+1 as follows:

$$\frac{(s+1)P_{max}}{S} = \sum_{j=1}^{s+1}\left(W_{s+1} - \frac{N_0 B/S}{h_{j,k_j^*}^2}\right) \quad (9)$$

Hence, using equation (7) and equation (8), the following equality holds:

$$sW_s - \sum_{j=1}^{s}\left(\frac{N_0 B/S}{h_{j,k_j^*}^2}\right) + \frac{P_{max}}{S} = \quad (10)$$

$$(s+1)W_{s+1} - \sum_{j=1}^{s}\left(\frac{N_0 B/S}{h_{j,k_j^*}^2}\right) - \frac{N_0 B/S}{h_{s+1,k_{s+1}^*}^2}$$

Then, the waterline at stage s+1 can be formulated as:

$$W_{s+1} = \left(sW_s + \frac{P_{max}}{S} + \frac{N_0 B/S}{h_{s+1,k_{s+1}^*}^2}\right)/(s+1)$$

Therefore, at each $s^{th}$ step of the scheduling process, for every candidate user set U, the waterline level is derived from $$W_{s,U} = \left((s-1)W_{s-1,U} + \frac{P_{max}}{S} + \frac{N_0 B/S}{h_{s,k_{s,U}^*}^2}\right)/s \quad (11)$$

where $k^*_{s,U}$ is the user showing the highest channel gain among scheduled users in the set U, over sub-band s. Once the waterline level at the actual stages is determined, power may then be provisionally assigned for each candidate set U as $P_{s,U}$ using:

$$P_{s,U} = W_{s,U} - \frac{N_0 B/S}{h_{s,k_{s,U}^*}^2} \quad (12)$$

Figure 2:
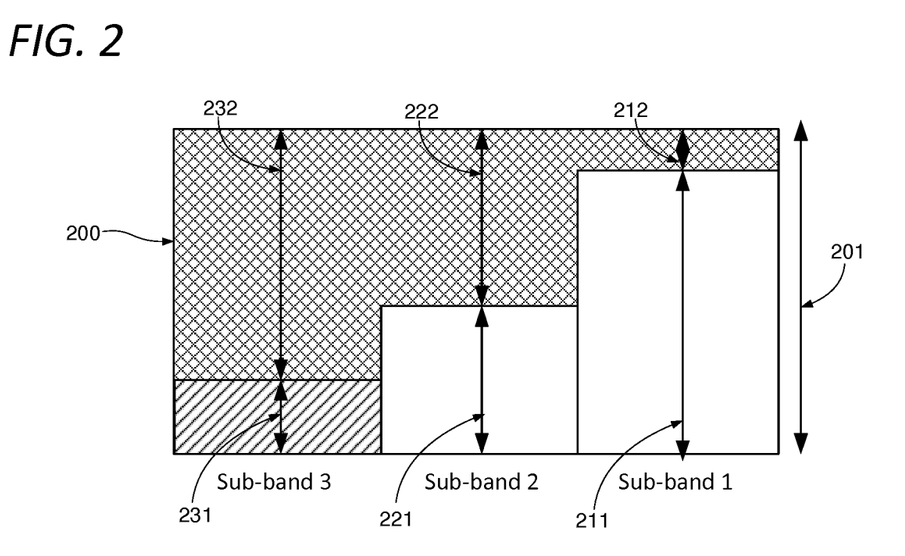
FIG. 2 demonstrates the application of the waterfilling approach, in accordance with the method of FIG. 1.

FIG. 2 demonstrates the application of the waterfilling approach, in accordance with the method of FIG. 1.

In certain implementations, a sub-band attenuation value may be used as an indicator of the channel gain for the candidate set of users is obtained. This sub-band attenuation value may be proportional to the reciprocal of the square of gain of the selected channel, corresponding for each combination to the highest of the channel gain value associated with the users in that candidate set.

As such, in certain variants, a waterfilling algorithm performed at step 120 may comprise determining a sub-band attenuation value proportional to the reciprocal of the square of the channel gain value of the user having the highest channel gain assigned to that sub-band, and distributing the provisional partial power budget using a floor for each sub-band defined by the respective sub-band attenuation value.

As shown in FIG. 2, users have been assigned to sub-bands 1 and 2 in previous iterations, and the sub-band under consideration in the current iteration of the steps of FIG. 1 is the sub-band 3.

The sub-band attenuation values of each of the sub-bands (the current sub-band sub-band3, and the two preceding sub-bands, sub-bands1 and sub-band 2) are illustrated arranged next to each other in order of magnitude, with the sub-band having the lowest sub-band attenuation value on the left, and the sub-band having the highest sub-band attenuation value on the right.

As such, in FIG. 2, the current sub-band sub band 3, having sub-band attenuation value 231 is situated to the left of the other two sub-bands. In accordance with the equations (10) and (11) above, the total power budget can be provisionally distributed amongst the three sub-bands under consideration such that the power assigned to the carrier under consideration and all other sub-bands to which users have been assigned is equal to a pro rata proportion of the total transmit power 3 Pmax/S (s=3) is distributed at stage 3, and such that, for each sub-band, the sum of the power provisionally assigned to that sub-band and the sub-band attenuation value of that sub-band is a constant.

Thus, as shown on FIG. 2, a first provisional power allocation 212 is implied for sub-band 1, a second provisional power allocation 222 is implied for sub-band 2, and a third provisional power allocation 232 is implied for sub-band under consideration, sub band 3, such that in each case the sum of each provisional power allocation with the corresponding sub-band attenuation value would be equal to a constant value 201, and the sum of the three values 212, 222, 232 is equal to a pro rata proportion of the total transmit power 3 Pmax/S.

As mentioned above, while providing a method of assigning power to sub-bands, the foregoing is silent as to the manner in which users are assigned to those sub-bands, or how power is distributed amongst users within each sub-band. A number of possible approaches to these questions are now presented by way of example.

Accordingly, the power allocated to each sub-band at step 120 may be attributed by a waterfilling algorithm such that the power allocated to each sub-band has regard to the channel gain of each user in the candidate pair, and the channel gain of any user already assigned to any sub-band in the current time slot.

It will be appreciated that the achievable throughput for $k_1$ and $k_2$ depends on the intra-sub-band and inter sub-band power allocation strategy.

On this basis, only the subset $S_2$ of users $k_2$ need be retained such that the cumulated achievable throughput of $k_1$ and $k_2$ on sub-band s is greater than the throughput of $k_1$ alone (that is, the OMA situation). If no user $k_2$ can satisfy this condition ($S_2 = \emptyset$), the method may simply adopt OMA, where user $k_1$ occupies the currently selected sub-band s.

The method of FIG. 1 next proceeds from step 120 to step 130, at which a candidate pair user throughput deviation value reflecting the aggregate of the respective difference between the average throughput across the set of candidate users and the known throughput of each of first user ($k_1$), the candidate second user ($k_2$), and each user attributed to a sub-band other than the selected sub-band is determined.

The throughput deviation value may be expressed as:

$$\frac{\sum_{k \in U_s} |R_{k,tot}(t) - AVG(t)|}{AVG(t)} \quad (13)$$

This might also be formulated in terms of the sum across all users, although in practice the results will be the same, since the result only varies as a function of the terms whose value depends on the candidate users under consideration, where:

$U_s$ is the subset of users comprising each user attributed to a sub-band other than the selected sub-band s and the pair of candidate users for attribution to the selected sub-band s, $R_{k,tot}(t)$ is the known throughput of user k in a past window of length $t_c$. In certain embodiments, the known throughput may be assumed to be equal to the average throughput of the user k, $T_k(t)$.

In an optional variant, the known throughput of a user k, $R_{k,tot}(t)$, may optionally take account of the projected throughput for the user k, $R_k(t)$, and the average throughput $T_k(t)$ during the assessment time window $t_c$. The projected throughput is, for the current time slot, the sum of the achievable throughputs for the user on each sub-band to which the user has been attributed. That is to say:

$$R_{k,tot}(t) = \left(1 - \frac{1}{t_c}\right) T_k(t) + \frac{R_k(t)}{t_c} \quad (14)$$

If user k has not been assigned any sub-band in the current allocation time slot t, $$\frac{R_k(t)}{t_c} = 0$$

And $$AVG(t) = \frac{1}{K} \sum_{k=1}^{K} R_{k,tot}(t)$$

is the average value of $R_{k,tot}(t)$, computed over all the users.

Accordingly, the known throughput for each user may take account of the projected throughput for that respective user for the current time slot in addition to the average throughput during an historical time window for that respective user.

The minimization of the metric in equation (13) tends to favour the pair of user ($k_1$, $k_2$) that makes the known throughput of every user as close as possible to the average throughput of all users. In a case where user $k_1$ was preselected on the basis of some other criterion, the minimization of the metric in equation (13) tends to favour user $k_2$, that makes the known throughput of every user as close as possible to the average throughput of all users. Perfect fairness is obtained when the metric is equal to zero. In equation (13), the pair of candidate users under consideration ($k_1$, $k_2$) does not explicitly appear in the expressions of the numerator or of the denominator but it actually has an impact on the values of the historical throughput values $R_{k,tot}(t)$ and on AVG(t) via the projected throughputs, $R_k(t)$.

Illustrating examples:

In case of equal power allocation: only the historical throughput values of the candidate pair of users under consideration $R_{k_1,tot}(t)$ and $R_{k_2,tot}(t)$, depend on the choice of the candidate pair of users, In case of iterative waterfilling (as described above): the choice of pair of users $k_1$ and $k_2$ has an impact on $R_{k_1,tot}(t)$ and $R_{k_2,tot}(t)$ and also on all values of $R_{k,tot}(t)$ for the users k already allocated in current time slot t.

By way of example, in implementation of these considerations, the step 130 of determining a candidate pair user throughput deviation value may comprise the further steps of:

calculating a known throughput of each user in said candidate pair, and any user already assigned to any sub-band in the current time slot, calculating an average total throughput as an average of the respective known throughput calculated for each of the users (K), calculating a user throughput deviation value for each user in the candidate pair, and any user already assigned to any sub-band in the current time slot, the user throughput deviation value corresponding to the difference between the respective known throughput for that user and the average total throughput value, and combining the respective user throughput deviation values for each user in the candidate pair, and any user already assigned to any sub-band in the current time slot to obtain the candidate pair user throughput deviation value.

At step 140, the method determines whether all user pairs have been considered, and in a case where user pairs remain to be considered, reverts to step 110, so as to repeat the steps of selecting a candidate pair of users, performing a provisional power allocation, and determining a candidate pair user throughput deviation value for a plurality of further candidate pair of users. Otherwise, where no user pairs remain to be considered, the method proceeds to step 150, at which whichever candidate pair of users corresponds to the smallest respective candidate pair user throughput deviation value is assigned to the sub-band under consideration.

The steps of the method of FIG. 1 thus implement the selection of the pair of users minimising a metric as:

$$(k_1, k_2) = \underset{(k',k'') \in S_2}{\mathrm{Argmin}} \frac{\sum_{k \in U_s} |R_{k,tot}(t) - AVG(t)|}{AVG(t)}$$

in a case where $S_2$ is the set of candidate pairs of users (both users are selected jointly), or otherwise, it becomes that:

$$k_2 = \underset{k' \in S_2}{\mathrm{Argmin}} \frac{\sum_{k \in U_s} |R_{k,tot}(t) - AVG(t)|}{AVG(t)}$$

in a case where user $k_1$ was preselected on the basis of some other criterion and where $S_2$ is the set of candidate second users.

Minimizing this metric means having the average throughput AVG(t) among all the users as high as possible and having a historical throughput for each user as close as possible to AVG(t).

The steps of selecting a candidate pair of users, performing a provisional power allocation, and determining a candidate pair user throughput deviation value, may be repeated until every possible candidate pair of users has been considered. Alternatively, the steps of selecting a candidate pair of users, performing a provisional power allocation, and determining a candidate pair user throughput deviation value, may be repeated until every possible candidate pair of users comprising a first candidate user satisfying a specified criterion has been considered. By way example, the specified criterion may be based on one or more of channel gain, distance to a target or throughput.

Optionally, the second user for consideration with a selected first user may be selected from a subset of users having a complementary channel gain to a selected first user.

A complementary channel gain is a channel gain, such that assigning a user having that channel gain to the selected sub-band together with the corresponding first user, would indicate a total sub-band throughput greater than the sub-band throughput achievable by assigning all available power as indicated by the provisional power allocation for the corresponding candidate pair of users for the respective sub-band to the first user.

In certain embodiments, a complementary second user may be a candidate second user which exhibits a large difference in channel gain with respect to the first user $k_1$, taking advantage of the fact that the total throughput in NOMA systems increases with the difference in channel gains of paired users. In certain embodiments, a complementary second user may be a candidate second user whose channel gain differs from that of the first user $k_1$, taking advantage of the fact that the total throughput in NOMA systems increases with the difference in channel gains of paired users.

Different mechanisms for identifying such complementary users may be envisaged. In a first, "brute force" implementation, the channel gain values may be computed for all the users $k_2$ (excluding the already selected first user $k_1$) for the sub-band s for which the second respective user is to be assigned, and for every candidate second user $k_2$, computing the achievable throughput for $k_1$ and $k_2$ on s.

The method as illustrated in FIG. 1, of attributing users to one or more of a plurality of sub-bands in a multiple access communications system achieves fairness among users in any time scale of interest and reduces the convergence time towards a required fairness performance, with short-term fairness being achieved, which is particularly beneficial when quasi-constant user rate is required, requires no deep buffering and is compatible with low-latency constraints. Furthermore, it provides higher total cell throughput than the classic PF scheduler. It may be associated with unequal power allocation techniques such as waterfilling. For NOMA schemes, it advantageously brings a reduction of the number of tested user pairs for each sub-band attribution, leading to a complexity decrease compared to PF.

The disclosed method may in some embodiments comprise an additional step of assigning a final power allocation to each user of each sub-band. This may be performed for example, for each sub-band, once all user allocations are complete for that sub-band in the current time slot. The final power allocation may be performed by a final iteration of the waterfilling method as described above.

The steps of selecting a candidate pair of users, performing a provisional power allocation, determining a candidate pair user throughput deviation value for a plurality of further candidate pair of users, and assigning to the sub-band whichever candidate pair of users corresponds to the smallest respective candidate pair user throughput deviation value may be repeated for each sub-band, until one or more users are attributed to each sub-band. The steps of selecting a candidate pair of users, performing a provisional power allocation, determining a candidate pair user throughput deviation value for a plurality of further candidate pair of users, and assigning to the sub-band whichever candidate pair of users may correspond to the smallest respective candidate pair user throughput deviation value for each sub-band, until one or more users are attributed to each sub-band, may be repeated for successive time slots.

Figure 3:
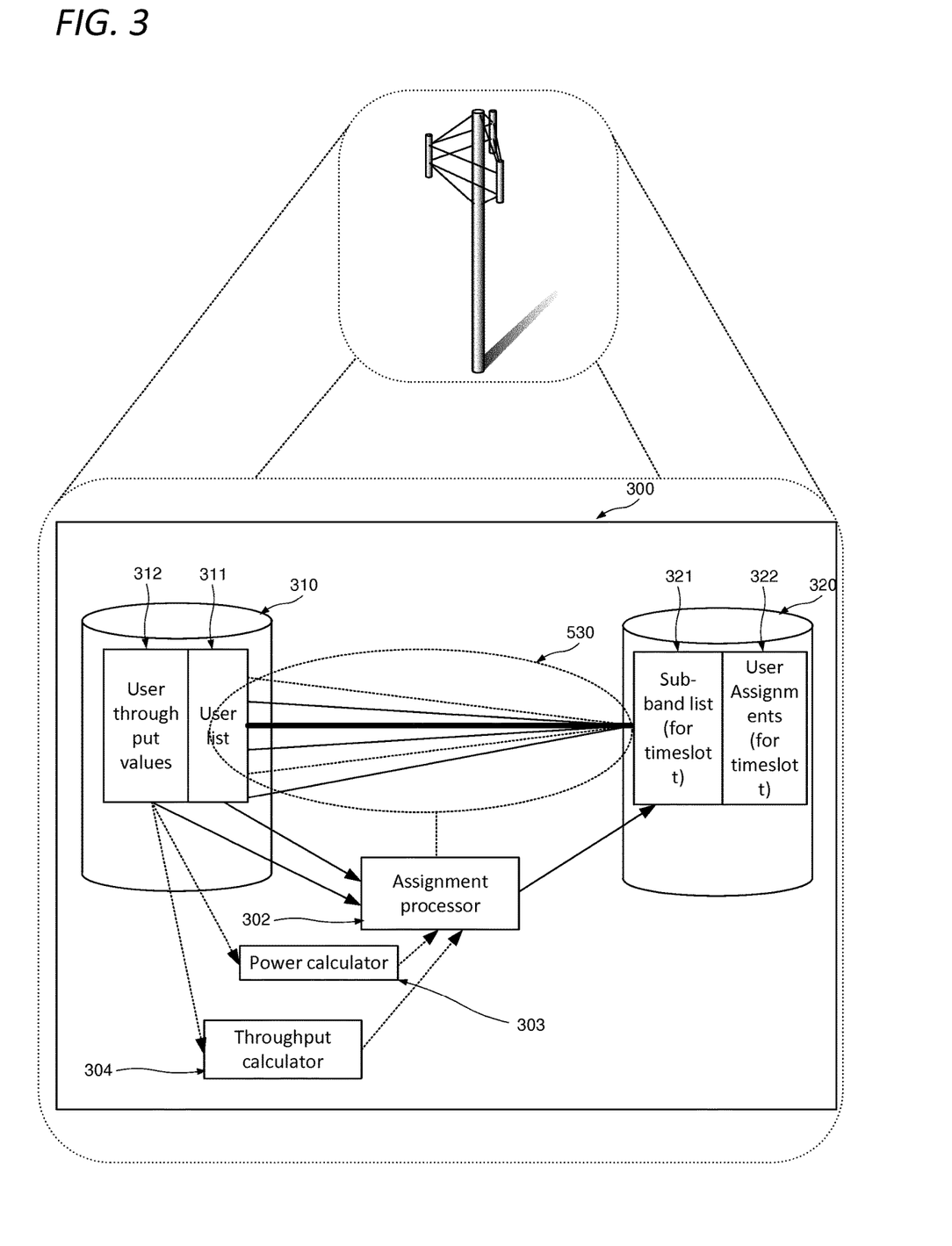
FIG. 3 shows a system according to an embodiment.

FIG. 3 shows a system according to an embodiment. As shown, there is provided a system 300 for assigning users from a set of candidate users to one of a plurality of sub-bands (s) in a current time slot (t) in a multiple access communications system based on Non-Orthogonal Multiple Access (NOMA), comprising an assignment processor 302, a power calculator 303 and a Throughput calculator 304. The assignment processor 302 is adapted to select a plurality of candidate pairs of users, which as shown are enumerated in a user list 311, each candidate pair comprising a respective first user ($k_1$) and a respective candidate second user ($k_2$), for consideration with respect to the selected sub-band, which as shown are enumerated in a sub-band list 321.

The power calculator 303 is adapted to perform a provisional power allocation to each sub-band with regard to each candidate pair.

The throughput calculator 304 is adapted to determine a respective candidate pair user throughput deviation value reflecting the aggregate of the respective difference between the average throughput across the set of candidate users (K) and the known throughput of each of the first user ($k_1$), the candidate second user ($k_2$) as obtained from throughput registry 312, and each user attributed to a sub-band other than the selected sub-band.

The assignment calculator is further adapted to assign to the sub-band whichever candidate pair of users corresponds to the smallest respective candidate pair user throughput deviation value. As shown such assignments are registered in an assignment registry 322.

The system 300 may be adapted to iteratively process users for each sub-band, until all sub-bands in the current time slot have been attributed. By the same token, the system 300 may sequentially process subsequent time slots.

It will be appreciated that alternative functional groupings may be envisaged, implementing equivalent operations. In particular, the storage of throughput values, user assignments and intermediate calculations may be stored in any convenience storage structure. Similarly, the functions of the Assignment processor, power calculator and Throughput calculator may be distributed between any number of functional units, which may be more or less in number that the three units described, and regardless of their number, may be distributed on any convenient basis. Still further, the functions may be implemented in one or more functional unit, sub divisions of each of which may correspond to any arbitrary grouping of functions ascribed to the three functional units described above.

It will be appreciated that the system of FIG. 3 or any equivalent functional grouping may further be adapted to implement the functions corresponding to any combination of the method steps described above with reference to any of FIG. 1 or 2.

By way of example, the system of FIG. 3 is represented as being associated with a cellular telephone tower, e.g. a base transceiving station. The skilled person will appreciate that equivalent functionality might equally be implemented in a communications device such as a telephone hand set, or in other parts of the communications network such as a Base station controller, mobile switching center, and so on.

The disclosed methods and/or functional groupings may take form of an entirely hardware embodiment (e.g. FPGA), an entirely software embodiment (for example to control a system according to the invention) or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or an instruction execution system. A computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Accordingly, there are provided a system and method for assigning users to a particular sub-band in a given time slot in a in multiple access communications system such as Non-Orthogonal Multiple Access (NOMA), where whichever pair of users corresponds to the smallest "candidate pair user throughput deviation value", reflecting the aggregate of the respective difference between the average throughput across all users (K) and the known throughput of each of the two users under consideration ($k_1 k_2$), and each user attributed to a sub-band other than said selected sub-band. User pairs for consideration may consider all possible pairs, or may be limited to candidate pairs satisfying together, or comprising one or both users who satisfy a criterion such as channel gain, distance to a target, throughput or a combination of some or all of these factors. The power allocated to each sub-band may be attributed by a waterfilling algorithm.

These methods and processes may be implemented by means of computer-application programs or services, application-programming interface (API), library, and/or other computer-program product, or any combination of such entities.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system for assigning users from a set of candidate users to one of a plurality of sub-bands (s) in a current time slot (t) in a multiple access communications system, comprising:
   an assignment processor adapted to select a plurality of candidate pairs of the users, each candidate pair comprising a respective first user ($k_1$) and a respective candidate second user ($k_2$), for consideration with respect to a selected sub-band,
   a power calculator adapted to perform a provisional power allocation to each sub-band with regard to each candidate pair,
   a throughput calculator adapted to determine a respective candidate pair user throughput deviation value reflecting an aggregate of a respective difference between an average throughput across the set of candidate users and a known throughput of the first user ($k_1$), a known throughput of the candidate second user ($k_2$), and a known throughput of each user attributed to a sub-band other than the selected sub-band,
   the assignment processor being further adapted to assign to the sub-band whichever candidate pair of users corresponds to the smallest respective candidate pair user throughput deviation value.

2. A method of selection of a first user ($k_1$) and a second user ($k_2$) among a set of candidate users for attribution to one of a plurality of sub-bands (s) in a current time slot (t) in a multiple access communications system based, comprising the steps of:
   selecting a candidate pair of users comprising a said first user ($k_1$) and a respective candidate second user ($k_2$), for consideration with respect to a selected sub-band,
   performing a provisional power allocation to each sub-band,
   determining a candidate pair user throughput deviation value reflecting an aggregate of a respective difference between an average throughput across the set of candidate users and a known throughput of the first user ($k_1$), a known throughput of the candidate second user ($k_2$), and a known throughput of each user attributed to a sub-band other than the selected sub-band,
   repeating the steps of selecting a candidate pair of users, performing a provisional power allocation, determining a candidate pair user throughput deviation value for a plurality of further candidate pair of users, and
   assigning to the selected sub-band whichever candidate pair of users corresponds to the smallest respective candidate pair user throughput deviation value.

3. The method of claim 2, wherein the power allocated to each sub-band in said provisional power allocation is attributed by a waterfilling algorithm such that the power allocated to each sub-band has regard to the channel gain of each user in each respective candidate pair, and the channel gain of any user already assigned to any sub-band in the current time slot.

4. The method of claim 2, wherein the known throughput for each user takes account of the projected throughput for that respective user for the current time slot, in addition to the average throughput during an historical time window for that respective user.

5. The method of claim 2, wherein the step of determining a candidate pair user throughput deviation value comprises the additional steps of:
   calculating a known throughput of each user in the candidate pair, and any user already assigned to any sub-band in the current time slot,
   calculating an average total throughput as an average of the respective known throughput calculated for each user in the set of candidate users,
   calculating a user throughput deviation value for each user in the candidate pair, and any user already assigned to any sub-band in the current time slot, the user throughput deviation value corresponding to the difference between the respective known throughput for that user and the average total throughput value, and
   combining the respective user throughput deviation values for each user in the candidate pair, and any user already assigned to any sub-band in the current time slot to obtain the candidate pair user throughput deviation value.

6. The method of claim 2, wherein the steps of selecting a candidate pair of users, performing a provisional power allocation, and determining a candidate pair user throughput deviation value, are repeated until every possible candidate pair of users has been considered.

7. The method of claim 2, wherein the steps of selecting a candidate pair of users, performing a provisional power allocation, and determining a candidate pair user throughput deviation value, are repeated until every possible candidate pair of users comprising a first candidate user satisfying a specified criterion has been considered.

8. The method of claim 7, wherein said specified criterion is based on one or more of channel gain, distance to a target or throughput.

9. The method of claim 2, wherein the steps of selecting a candidate pair of users, performing a provisional power allocation, determining a candidate pair user throughput deviation value for a plurality of further candidate pairs of users, and assigning to the sub-band whichever of the candidate pairs of users corresponds to the smallest respective candidate pair user throughput deviation value are repeated for each sub-band, until one or more users are attributed to each sub-band.

10. The method of claim 9, wherein the step of selecting a candidate pair of users, performing a provisional power allocation, determining a candidate pair user throughput deviation value for a plurality of further candidate pairs of users, and assigning to the sub-band whichever of the candidate pairs of users corresponds to the smallest respective candidate pair user throughput deviation value for each sub-band, until one or more users are attributed to each sub-band are repeated for successive said time slots.

11. An apparatus adapted to implement the steps of claim 2.

12. A computer program adapted to implement the steps of claim 2.

13. A computer readable medium incorporating the computer program of claim 12.

* * * * *